United States Patent
Sato et al.

(10) Patent No.: US 11,815,467 B2
(45) Date of Patent: Nov. 14, 2023

(54) NANO PROJECTION STRUCTURE INSPECTION APPARATUS AND NANO PROJECTION STRUCTURE INSPECTION METHOD

(71) Applicants: Prime Planet Energy & Solutions, Inc., Tokyo (JP); TOYOTA JIDOSHA KABUSHIKI KAISHA, Aichi-ken (JP)

(72) Inventors: Yuki Sato, Toyota (JP); Syoichi Tsuchiya, Toyota (JP); Masataka Asai, Toyota (JP); Tsuyoshi Asano, Toyota (JP); Masahiro Uchimura, Toyota (JP); Nozomi Tateyama, Okazaki (JP)

(73) Assignees: PRIME PLANET ENERGY & SOLUTIONS, INC., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/670,492

(22) Filed: Feb. 13, 2022

(65) Prior Publication Data
US 2022/0260501 A1 Aug. 18, 2022

(30) Foreign Application Priority Data

Feb. 15, 2021 (JP) .................. 2021-021403

(51) Int. Cl.
*G01N 21/88* (2006.01)

(52) U.S. Cl.
CPC . *G01N 21/8806* (2013.01); *G01N 2021/8835* (2013.01)

(58) Field of Classification Search
CPC ........ G01N 21/8806; G01N 2021/8835; G01N 21/956; G01N 21/8851; G01N 21/95684
See application file for complete search history.

(56) References Cited

U.S. PATENT DOCUMENTS

| | | | |
|---|---|---|---|
| 9,310,319 B2 * | 4/2016 | Sato | G01N 21/4738 |
| 9,683,944 B2 * | 6/2017 | Moroli | G01N 21/8903 |
| 11,231,359 B2 * | 1/2022 | Teraoka | G01N 21/255 |
| 11,328,380 B2 * | 5/2022 | Pinter | G06T 7/586 |
| 11,430,233 B2 * | 8/2022 | Kozicki | G06V 20/698 |

FOREIGN PATENT DOCUMENTS

| | | |
|---|---|---|
| JP | 201452339 A | 3/2014 |
| JP | 2019181711 A | 10/2019 |

\* cited by examiner

*Primary Examiner* — Hung V Nguyen
(74) *Attorney, Agent, or Firm* — HAUPTMAN HAM, LLP

(57) ABSTRACT

A nano projection structure inspection apparatus herein disclosed includes an inspection light irradiation part and a chromameter. The inspection light irradiation part irradiates inspection light to an inspected surface being a surface of a metal. An imaging optical axis of an imaging element of the chromameter is arranged to be tilted to a regular reflection direction of the inspection light caused by the inspected surface. The chromameter makes the imaging element receive diffusion reflection light, among reflection light of the inspection light from the inspected surface, the reflection light containing regular reflection light and the diffusion reflection light, so as to inspect a nanoscale projection structure on the inspected surface.

4 Claims, 3 Drawing Sheets

NANO PROJECTION STRUCTURE INSPECTION APPARATUS AND NANO PROJECTION STRUCTURE INSPECTION METHOD

CROSS-REFERENCE TO RELATED APPLICATIONS

The present application claims the priority based on Japanese Patent Application No. 2021-021403 filed on Feb. 15, 2021, the entire contents of which are incorporated in the present specification by reference.

BACKGROUND OF THE INVENTION

1. Field of the Invention

The present teaching relates to a nano projection structure inspection apparatus and a nano projection structure inspection method for performing inspection for a nano projection structure formed on a metal surface.

2. Description of the Related Art

A technique has been proposed to optically inspect a surface of an inspected member. For example, Japanese Patent Application Publication No. 2014-52339 describes a surface concave and convex part inspection apparatus that includes an irradiation part, an imaging part, and an inspection part. The irradiation part irradiates linear light to an inspected surface from an obliquely upward position. The imaging part takes an image only of regularly-reflected reflection light of linear light among the linear light reflected from the inspected surface. Based on the luminance of the reflection light, the inspection part obtains a surface angle of the inspected surface from which the reflection light is emitted, and then inspects for the concave and convex part state of the inspected surface based on the obtained surface angle. The above-described cited document describes that a defect, being a gap about 10 μm of the concave and convex part, can be inspected.

SUMMARY

Recently, a technique of forming a nanoscale projection structure (hereinafter, referred to as simply "nano projection structure") on a metal surface has gradually attracted attention. For example, by joining a resin body to a metal surface on which the nano projection structure is formed, a trial for improving join strength of the metal and the resin body, or the like, has been performed. However, for the conventional optical inspection method illustrated in the above-described cited document, there has been a limit on inspecting the presence of microscale defects on the inspected surface, and thus inspecting the nano projection structure has been difficult. In addition, it is possible to use a scanning electron microscope (SEM), or the like, for observing a cross section part of the metal surface on which the microscopic structure is formed, so as to inspect the nanoscale projection. However, the range inspected by the scanning electron microscope is very small, and further it might require destroying the metal for observing the cross section part. As described above, it has been difficult for the conventional technique to efficiently inspect the nano projection structure formed on the metal surface.

It is a typical object of the present teaching to provide a nano projection structure inspection apparatus and a nano projection structure inspection method that can efficiently inspect a nano projection structure formed on a metal surface.

A nano projection structure inspection apparatus of one aspect herein disclosed includes an inspection light irradiation part and a chromameter. The inspection light irradiation part irradiates inspection light to an inspected surface being a metal surface. The inspected surface causes reflection light from the inspection light, to have the reflection light contain regular reflection light and diffusion reflection light. The chromameter is arranged with an imaging element whose imaging optical axis is tilted to a regular reflection direction of the inspection light caused by the inspected surface, and the chromameter makes the imaging element receive the diffusion reflection light among the reflection light of the inspection light from the inspected surface containing the regular reflection light and the diffusion reflection light, so as to inspect a nanoscale projection structure on the inspected surface.

In addition, a nano projection structure inspection method of one aspect herein disclosed includes an inspection light irradiation step and an inspection step. The inspection light irradiation step is to make an inspection light irradiation part irradiate inspection light to an inspected surface being a metal surface. The inspected surface causes reflection light from the inspection light, to have the reflection light contain regular reflection light and diffusion reflection light. The inspection step is to use a chromameter arranged with an imaging element whose imaging optical axis is tilted to a regular reflection direction of the inspection light, and the inspection step is to make the chromameter take an image of the diffusion reflection light among the reflection light of the inspection light from the inspected surface containing the regular reflection light and the diffusion reflection light, so as to inspect a nanoscale projection structure on the inspected surface.

The inventors of the present application found that, if the direct reflection light of the inspection light from the inspected surface was received by the imaging element, slight metallic luster remaining on the metal surface affects the imaging result of the chromameter and thus the inspection precision for the nano projection structure was reduced. In other words, the inventors of the present application found that, if receiving the direct reflection light among the reflection light of the inspection light from the inspected surface by the imaging element was suppressed and receiving the diffusion reflection light was implemented to take an image, the correlations between the shapes of a plurality of nanoscale projections formed on the inspected surface (e.g., the height from the root to the tip of the projection, or the like) and the imaging results of the chromameter became higher.

In the nano projection structure inspection apparatus and the nano projection structure inspection method in accordance with the present disclosure, the imaging optical axis of the imaging element of the chromameter is tilted to the regular reflection direction of the inspection light caused by the inspected surface. As a result, receiving the direct reflection light, among the reflection light of the inspection light from the inspected surface, by the imaging element is suppressed and thus it facilitates receiving only the diffusion reflection light. Accordingly, the correlations between the imaging results of the chromameter and the shapes of the nano projection structures on the inspected surface become higher, and thus the inspection for the nano projection structure is properly performed on the basis of the imaging results of the chromameter. In addition, it is easy for the chromameter to take an image of a two-dimensional area on the inspected surface by a two-dimensional imaging element or the combination of a one-dimensional imaging element (line sensor) and scanning in the one-dimensional direction. Accordingly, the inspection efficiency is better, in comparison to the case where the inspection is performed only on a microscopic area on the inspected surface (e.g., in the case where a scanning electron microscope is used, or the like). It is not required even to destroy the inspected surface. Therefore, the inspection for a nano projection structure formed on a metal surface can be properly performed.

In accordance with one effective aspect of the nano projection structure inspection apparatus and the nano projection structure inspection method herein disclosed, the material of the metal is copper. The wavelength region of the inspection light irradiated to the inspected surface contains a wavelength region of visible light. The chromameter outputs at least the light reception result of the wavelength region of the visible light.

The inventors of the present application found that, in the case where the material of the metal is copper, the shape of the nano projection structure on the inspected surface brings a significantly strong effect on the strength of wavelength region of visible light measured by the chromameter. Accordingly, in the case where the material of the metal is copper, using the light reception result of the wavelength region of the visible light implements performing more precise inspection for the nano projection structure.

Incidentally, the wavelength region of the visible light might contain, for example, at least a part of a wavelength region of 400 nm to 800 nm. Further, in the case where the material of the metal is copper, the material of the nano projection structure might contain at least any of copper oxide and hydroxide copper. In this case, based on the light reception result of the wavelength region of the visible light, the inspection for the nano projection structure can be performed properly.

In accordance with one effective aspect of the nano projection structure inspection apparatus and the nano projection structure inspection method herein disclosed, the material of the metal is aluminum, the wavelength region of the inspection light irradiated to the inspected surface contains a wavelength region of the near ultraviolet light, and the chromameter outputs at least the light reception result of the wavelength region of the near ultraviolet light.

The inventors of the present application found that, in the case where the material of the metal is aluminum, the shape of the nano projection structure on the inspected surface brings a significantly strong effect on the strength of the wavelength region of the near ultraviolet light measured by the chromameter. Accordingly, in the case where the material of the metal is aluminum, using the light reception result of the wavelength region of the near ultraviolet light implements performing more precise inspection for the nano projection structure.

Incidentally, the wavelength region of the near ultraviolet light might contain, for example, at least a part of a wavelength region of 200 nm to 380 nm. Further, in the case where the material of the metal is aluminum, the material of the nano projection structure might contain aluminum oxide. In this case, based on the light reception result of the wavelength region of the near ultraviolet light, the inspection for the nano projection structure can be performed properly.

A method for forming the nano projection structure on the metal surface also can be selected appropriately. For example, by irradiating laser light to a plurality of portions on the metal surface, multiple nano projection structures might be formed on the metal surface. In this case, the metal positioned at the irradiated portions to which the laser light are irradiated melt, and thus the nano projection structures are formed respectively at peripheral parts of the irradiated portions. The diameters of the irradiated portions might be 10 μm to 200 μm, and the depths of the depressions on the irradiated portions caused by the laser light might be 5 μm to 20 μm. In addition, the widths of the nano projection structures might be 5 nm to 20 nm, and the heights of the nano projection structures might be 10 nm to 1000 nm.

In accordance with one effective aspect of the nano projection structure inspection apparatus and the method herein disclosed, the tilt angle of the imaging optical axis of the imaging element of the chromameter to the regular reflection direction of the inspection light caused by the inspected surface is equal to or more than 50 degrees. In this case, receiving the direct reflection light of the inspection light from the inspected surface by the imaging element is properly suppressed. Thus, the correlation between the imaging result of the chromameter and the shape of the nano projection structure on the inspected surface becomes higher and the inspection precision is further improved.

In the inspection light irradiation step, the inspection light irradiation part might irradiate the inspection light to the inspected surface from symmetrical directions in which the imaging optical axis of the imaging element of the chromameter is arranged at the center. In this case, it facilitates making the quantity of the inspection light irradiated to the inspected surface be uniform, and thus the inspection precision is further improved.

DETAILED DESCRIPTION OF THE PREFERRED EMBODIMENTS

Below, one of typical embodiments in the present disclosure will be described in details by reference to the accompanying drawings. The matters other than matters particularly mentioned in this specification, and required for practicing the present invention can be grasped as design matters of those skilled in the art based on the related art in the present field. The present teaching can be executed based on the contents disclosed in the present specification, and the technical common sense in the present field. Incidentally, in the following accompanying drawings, the members/parts providing the same effect are given the same numerals and signs. Further, the dimensional relation (such as length, width, or thickness) in each drawing does not reflect the actual dimensional relation. In the case where the numerical value range is represented as A to B (A and B are arbitrary values) in the present specification, it means equal to or more than A and equal to or more than B. Thus, it covers the case where the numerical value range is more than A and less than B.

Figure 1:
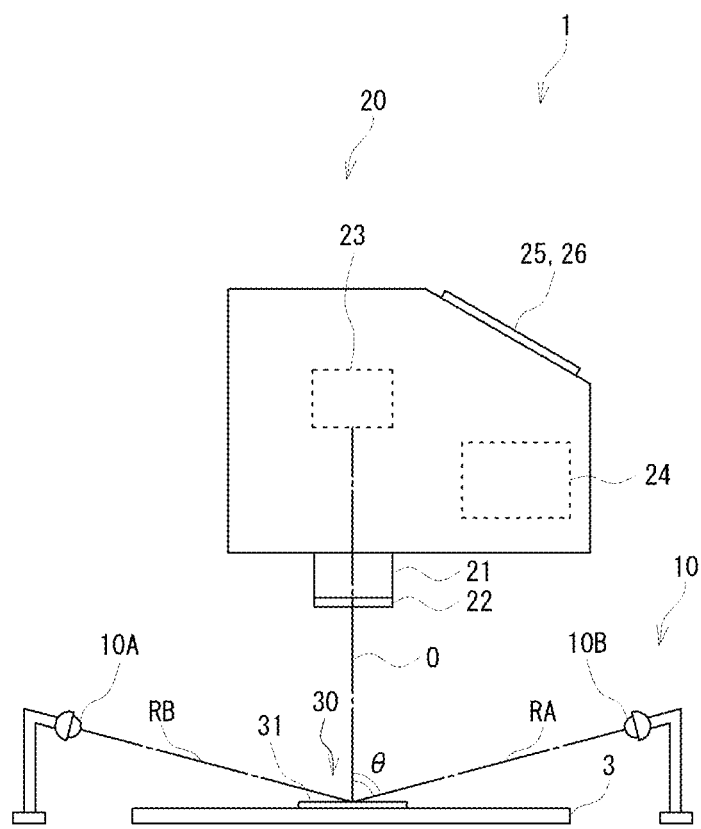
FIG. 1 is a side view of a nano projection structure inspection apparatus 1.

(Apparatus Configuration) Referring to FIG. 1, a configuration of a nano projection structure inspection apparatus 1 in the present embodiment will be described. FIG. 1 is a side view of the nano projection structure inspection apparatus 1. The nano projection structure inspection apparatus 1 in the present embodiment includes an inspection light irradiation part 10 and a chromameter 20. The inspection light irradiation part 10 irradiates inspection light to an inspected surface 31 which is a surface of a metal sample 30. The chromameter 20 takes an image of the inspected surface 31 of the sample 30 so as to measure luminance (luminance and chromaticity in the present embodiment) within the inspected surface 31.

Incidentally, in the present embodiment, the flat-plate-shaped sample 30 is mounted on a flat stage 3. The inspection light is irradiated from an obliquely upward position relative to the inspected surface 31 which is a top surface of the sample 30. The chromameter 20 takes an image of the inspected surface 31 of the sample 30 from a vertically upward position. However, the angle at which each member is disposed might be changed. For example, the inspected surface 31 of the sample 30 might be disposed not along a horizontal direction but along an oblique direction or a vertical direction. In this case, it is preferred that the angles of the inspection light irradiation part 10 and the chromameter 20 are adjusted according to the angle of the inspected surface 31. Details of the angle, or the like, of the inspection light irradiation part 10, or the like, relative to the inspected surface 31 would be described later.

The chromameter 20 includes an objective lens 21, an imaging element 23, a control part 24, a display part 25, and an operation part 26. The objective lens 21 is provided on an imaging light path which reaches the imaging element 23 from the inspected surface 31, to guide light coming from the inspected surface 31 to the imaging element 23. In other words, the imaging optical axis O of the imaging element 23 is to pass through the optical axis of the objective lens 21 and then to reach the inspected surface 31. Incidentally, although details would be described later, according to the present embodiment, in the case where the material of the metal forming the sample 30 is aluminum, the wavelength region of the inspection light contains a wavelength region of near ultraviolet light. In this case, on the imaging light path reaching the imaging element 23 from the inspected surface 31 (at the side of the inspected surface 31 of the objective lens 21 in the present embodiment), a filter 22 is disposed that permeates a major part of light of the near infrared light wavelength region but blocks a major part of light of the other wavelength region. As a result, the light of the wavelength region other than the near ultraviolet light is hardly received by the imaging element 23, and thus the inspection precision is improved.

The imaging element 23 receives the light guided from the inspected surface 31 so as to take an image of the inspected surface 31. As one example of the imaging element 23 in the present embodiment, a two-dimensional CCD image sensor is adopted in which a plurality of light receiving elements are arranged in a latticed manner. Accordingly, the nano projection structure inspection apparatus 1 in the present embodiment can take an image of the two-dimensional inspected surface 31 in a state making the sample 30 be stationary. However, the method for taking an image of the two-dimensional inspected surface 31 can be changed. For example, as the imaging element, a line sensor might be used in which a plurality of light receiving elements are arranged in a one-dimensional direction. In this case, the nano projection structure inspection apparatus might include a carrying part that carries the sample 30 in a direction crossing to the line sensor, and take an image by the line sensor while carrying the sample 30, so as to take the image of the two-dimensional inspected surface 31.

The control part 24 performs controlling the chromameter 20. Particularly, the control part 24 includes a controller (e.g., CPU) that performs various controls and the control part 24 includes a storage device that can store program, data, or the like. Incidentally, the control part 24 of the chromameter 20 might further play a role as a control unit that controls the whole of the nano projection structure inspection apparatus 1.

The display part 25 displays various images. For example, the chromameter 20 can make the display part 25 display an image, or the like, showing distribution of the measured luminances within the inspected surface 31. The operation part 26 is operated by a user in order to allow the user to input various instructions. As one example of the operation part 26 in the present embodiment, a touch panel disposed on the display surface of the display part 25 is used. However, at least any of a keyboard, a mouse, an operation button, and the like, might be used as the operation part. Incidentally, as the chromameter 20 in the present embodiment, ProMetric (registered trademark) 116 being a chromameter made by KONICA MINOLTA, INC. is used.

The inspection light irradiation part 10 irradiates the inspection light to the inspected surface 31 from symmetrical directions (a plurality of directions in the present embodiment) in which the imaging optical axis O of the imaging element 23 of the chromameter 20 is arranged at the center. Accordingly, it facilitates making the quantity of the inspection light irradiated on the inspected surface 31 be uniform, and thus the inspection precision for the nano projection structure is improved better than the case where the quantity of light is ununiform. As one example, in the present embodiment, two inspection light irradiation parts 10A, 10B respectively irradiate the inspection light to the inspected surface 31 from the symmetrical directions in which the imaging optical axis O is arranged at the center (in other words, from the directions facing mutually across the imaging optical axis O). However, three or more inspection light irradiation parts might be arranged in a ring shape where the imaging optical axis O is positioned at the center (preferably, point-symmetrically). In addition, an inspection light irradiation part having a ring-shaped light emitting part might be used to irradiate the inspection light uniformly to the inspected surface 31.

Incidentally, the nano projection structure is previously formed on the inspected surface 31 of the sample 30 in the present embodiment. In the present embodiment, the nano projection structure is formed on the inspected surface 31 in order to improve the join strength of the surface (inspected surface 31) of the metal sample 30 and a resin body. Inspecting whether the nano projection structure is properly formed on the inspected surface 31 or not can implement predicting whether the inspected surface and the resin body can be firmly joined or not.

As one example, in the present embodiment, laser light is irradiated to each of the plurality of portions on the inspected surface 31. As a result, the metals positioned at the irradiated portions to which the laser light is irradiated melt, and thus the nano projection structure is formed at the peripheral part of each irradiated portion. The diameter of the irradiated portion is 10 μm to 200 μm, and the depth of the depression on the irradiated portion caused by the laser light is 5 µm to 20 µm. In addition, the width of the nano projection structure is 5 nm to 20 nm, and the height of the nano projection structure is 10 nm to 1000 nm. Incidentally, in the case where the metal material forming the sample 30 is copper, the material of the nano projection structure might contain at least any of copper oxide and hydroxide copper. In addition, in the case where the material of the metal forming the sample 30 is aluminum, the material of the nano projection structure contains aluminum oxide.

Figure 2:
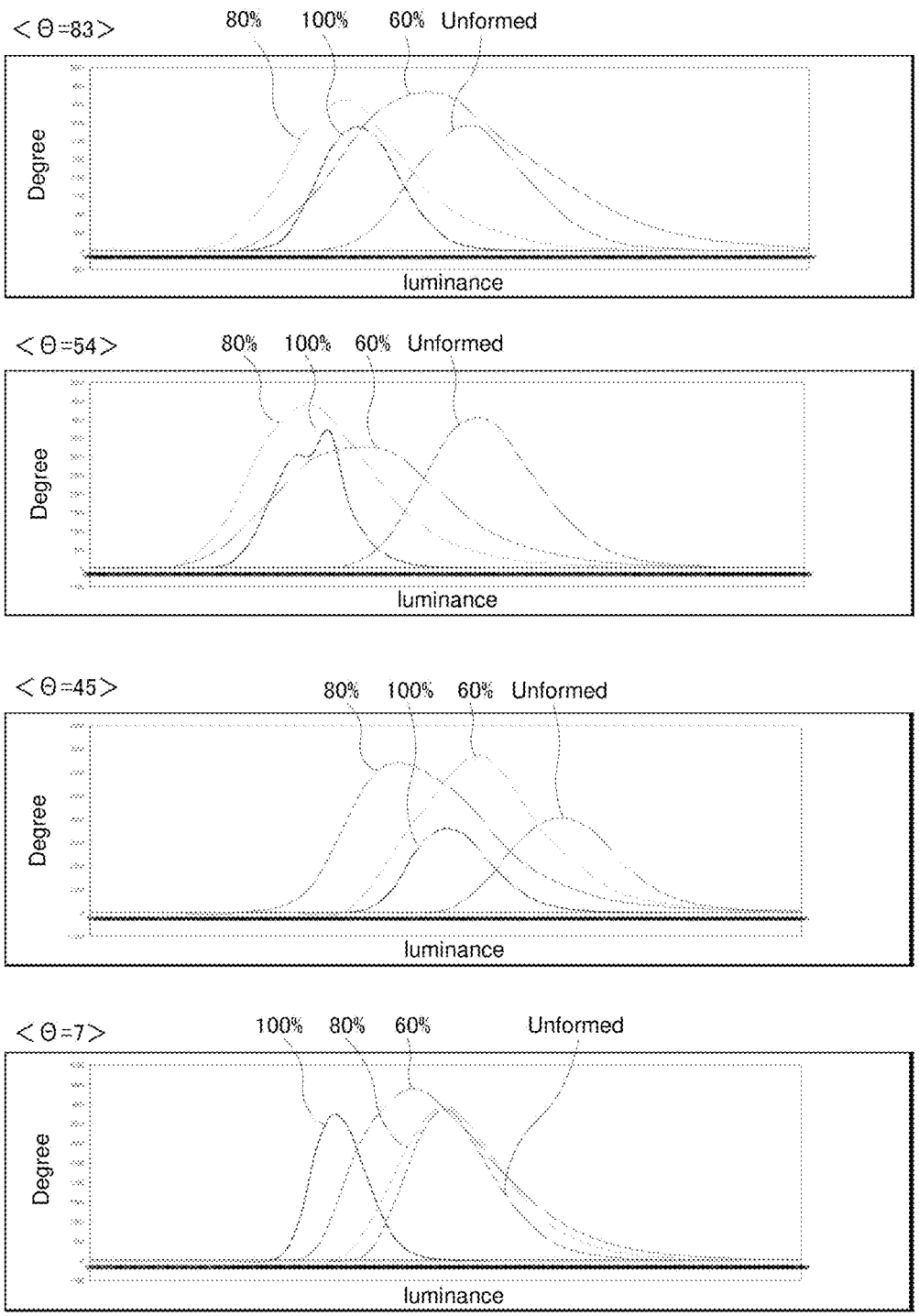
FIG. 2 shows histograms of luminances of an inspected surface 31 measured in a state adjusting the angle θ to be 83 degrees, 54 degrees, 45 degrees, and 7 degrees, respectively.

Referring to FIG. 1 and FIG. 2, it will be described about the angle relation of the imaging optical axis ○ of the imaging element 23 of the chromameter 20 with respect to the regular reflection direction of measurement light caused by the inspected surface 31. FIG. 1 shows a regular reflection direction RA of the inspection light emitted from the inspection light irradiation part 10A, the regular reflection direction RA being caused by the inspected surface 31, and shows a regular reflection direction RB of the inspection light emitted from the inspection light irradiation part 10B, the regular reflection direction RB being caused by the inspected surface 31. In addition, the angle defined by the regular reflection direction RA and the imaging optical axis ○ of the imaging element 23 is represented as θ. Incidentally, in the present embodiment, the angle defined by the regular reflection direction RB and the imaging optical axis ○ also becomes θ.

As shown in FIG. 1, the imaging optical axis ○ of the imaging element 23 of the chromameter 20 is arranged to be tilted to the regular reflection directions RA, RB of the inspection light caused by the inspected surface 31. As a result, while the inspected surface 31 causes reflection light from the inspection light and the reflection light contains direct reflection light and diffusion reflection light, receiving the direct reflection light by the imaging element 23 among the reflection light of the inspection light caused by the inspected surface 31 is suppressed and thus it facilitates receiving only the diffusion reflection light. Accordingly, the correlation between the imaging result of the chromameter 20 (e.g., two-dimensional distribution of the luminances of the diffusion reflection light represented on the taken image) and the shape of the nano projection structure on the inspected surface 31 (in the present embodiment, mainly, the height distribution for the plurality of nano projection structures) becomes higher. Therefore, the inspection for the nano projection structure on the two-dimensional area in the inspected surface 31 is properly performed.

The inventors of the present application performed a test for deciding a proper range of the angle θ defined by the regular reflection directions RA, RB of the inspection light caused by the inspected surface 31 and the imaging optical axis ○ of the imaging element 23. For this test, at first, four samples 30 respectively having different conditions of forming the nano projection structures were prepared. In the first sample 30, the nano projection structure was formed with the output of the laser light being 100% of a specified value. In the second sample 30, the nano projection structure was formed with the output of the laser light being 80% of the specified value. In the third sample 30, the nano projection structure was formed with the output of the laser light being 60% of the specified value. In the fourth sample 30, no nano projection structure was formed. The materials of four samples 30 used in this test were aluminum. Then, in a state adjusting the angle θ defined by the regular reflection directions RA, RB of the inspection light and the imaging optical axis ○ respectively to be 83 degrees, 54 degrees, 45 degrees, and 7 degrees, the chromameter 20 is used to take images of the inspected surfaces 31 of the four samples 30.

FIG. 2 shows histograms of luminances of the inspected surface 31 measured in a state adjusting the angle θ to be 83 degrees, 54 degrees, 45 degrees, and 7 degrees, respectively. In a normal operation, the more the output of the laser light is decreased from the specified value, the lower the height of the nano projection structure formed on the inspected surface 31 of the sample 30 becomes. In addition, the higher the height of the nano projection structure is, the lower the strength of the measured return light becomes. Accordingly, if the luminance of the inspected surface 31 on which the nano projection structure is formed with the higher output of laser light (luminances for "100%" and "80%" in FIG. 2) is lower than the luminance of the inspected surface 31 on which the nano projection structure is not formed (luminance for "unformed" in FIG. 2), it would be concluded that the correlation between the shape of the nano projection structure on the inspected surface 31 and the measured luminance of the inspected surface 31 is higher.

As shown in FIG. 2, in the case where the angle θ is adjusted to be 83 degrees, the histograms of the luminances for "100%" and "80%" are clearly different from the histogram of the luminance for "unformed". In addition, even in the case where the angle θ is adjusted to be 54 degrees, the histograms of the luminances for "100%" and "80%" are clearly different from the histogram of the luminance for "unformed". In these cases, it would be concluded that the correlation between the shape of the nano projection structure on the inspected surface 31 and the luminance of the inspected surface 31 measured by the chromameter 20 is higher. If the correlation between the shape of the nano projection structure on the inspected surface 31 and the luminance is higher, it is possible to properly perform the inspection for the nano projection structure based on the measured luminance.

On the other hand, in the case where the angle θ is adjusted to be 45 degrees, the overlap between the histograms of the luminances for "100%" and "80%" and the histogram of the luminance for "unformed" is increased, in comparison with the case where the angle θ is adjusted to be 83 degrees or 54 degrees. The reason for this matter is considered that making the angle θ be smaller increases the direct reflection light received by the imaging element 23 of the chromameter 20 among the direct reflection light of the inspection light caused by the inspected surface 31. Further, in the case where the angle θ is adjusted to be 7 degrees, the histograms for "80%", "60%", and "unformed" overlap greatly on each other.

Based on the above described results, in the present embodiment, the tilt angle of the imaging optical axis ○ of the imaging element 23 to the regular reflection directions RA, RB of the inspection light caused by the inspected surface 31 is set to be equal to or more than 50 degrees. As a result, the inspection precision is secured sufficiently.

Figure 3:
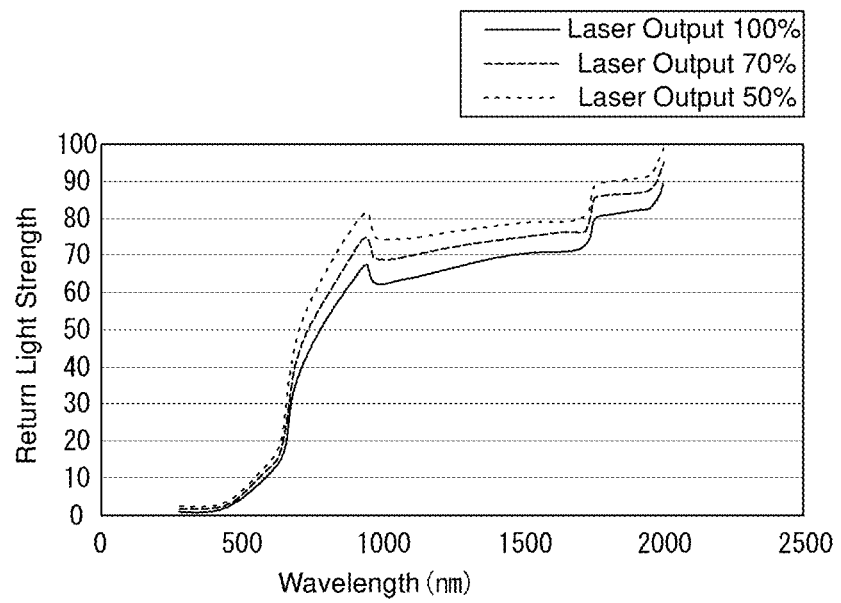
FIG. 3 is a graph showing the measured strength of return light from the inspected surface 31 for each wavelength in the case where the material of the sample is copper.
Figure 4:
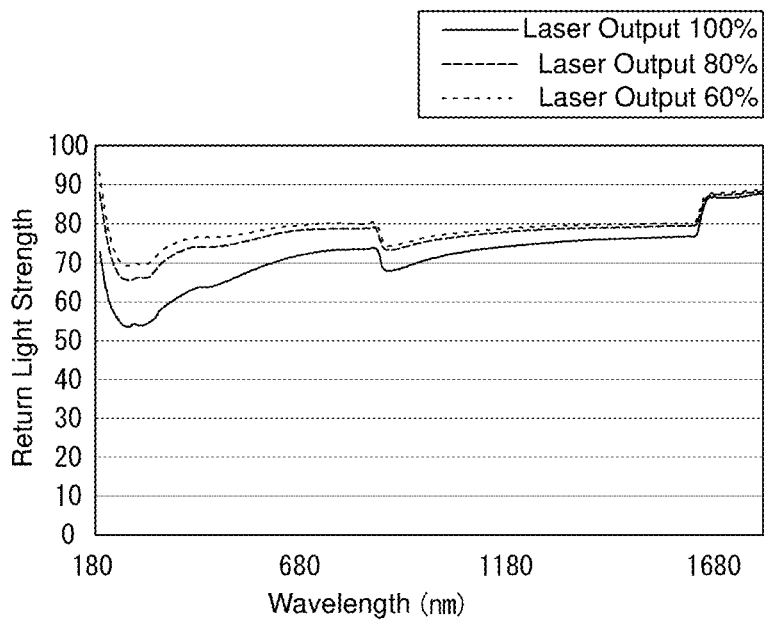
FIG. 4 is a graph showing the measured strength of return light from the inspected surface 31 for each wavelength in the case where the material of the sample is aluminum.

Referring to FIG. 3 and FIG. 4, it will be described about a relation between the material of the sample 30 to be the inspection target and the wavelength region of the inspection light. FIG. 3 is a graph showing the measured strength of return light from the inspected surface 31 (diffusion reflection light) for each wavelength in the case where the material of the sample 30 is copper. In FIG. 3, the graph of solid line represents a measurement result for the sample 30 on which the nano projection structure is formed with the output of the laser light being 100% of the specified value. The graph of broken line represents a measurement result for the sample 30 on which the nano projection structure is formed with the output of the laser light being 70% of the specified value. The graph of dotted line represents a measurement result for the sample 30 on which the nano projection structure is formed with the output of the laser light being 50% of the specified value. In addition, FIG. 4 is a graph showing the measured strength of return light from the inspected surface 31 (diffusion reflection light) for each wavelength in the case where the material of the sample 30 is aluminum. In FIG. 4, the graph of solid line represents a measurement result for the sample 30 on which the nano projection structure is formed with the output of the laser light being 100% of the specified value. The graph of broken line represents a measurement result for the sample 30 on which the nano projection structure is formed with the output of the laser light being 80% of the specified value. The graph of dotted line represents a measurement result for the sample 30 on which the nano projection structure is formed with the output of the laser light being 60% of the specified value.

As shown in FIG. 3, in the case where the material of the sample 30 is copper, the difference in the measurement results for three samples 30 becomes larger on the wavelength region of the visible light (especially, the wavelength region near about 800 nm). On the other hand, the difference in the measurement results for three samples 30 is almost absent on the wavelength region near about 380 nm being the wavelength region of the near ultraviolet light. Based on the above described results, in the present embodiment, when the material of the sample 30 is copper, the wavelength of the inspection light irradiated to the inspected surface 31 is set to contain the wavelength region of the visible light. The chromameter 20 outputs at least the light reception result of the wavelength region of the visible light. As a result, it implements more precise inspection for the nano projection structure.

In addition, as shown in FIG. 4, when the material of the sample 30 is aluminum, the difference in the measurement results for three samples 30 on the wavelength region (200 nm to 380 nm) of the near ultraviolet light becomes larger than the difference on the wavelength region (400 nm to 800 nm) of the visible light. Based on the above described results, in the present embodiment, when the material of the sample 30 is aluminum, the wavelength of the inspection light irradiated to the inspected surface 31 is set to contain the wavelength region of the near ultraviolet light. The chromameter 20 outputs at least the light reception result of the wavelength region of the near ultraviolet light. As a result, it implements more precise inspection for the nano projection structure.

It will be described about the nano projection structure inspection method in the present embodiment. The nano projection structure inspection method can be performed by using the previously described nano projection structure inspection apparatus 1. The nano projection structure inspection method includes an inspection light irradiation step and an inspection step. In the inspection light irradiation step, the inspection light is irradiated by the inspection light irradiation part 10 to the inspected surface 31 being the surface of the sample 30. In the inspection step, the image of the diffusion reflection light is taken by the chromameter 20 in which the imaging optical axis O of the imaging element 23 is arranged to be tilted to the regular reflection directions RA, RB of the inspection light caused by the inspected surface 31, so as to inspect the nanoscale projection structure of the inspected surface 31. As a result, although described above, the nano projection structure on the inspected surface 31 is properly inspected. Incidentally, the relation between the material of the sample 30 and the wavelength region of the inspection light, the relation between the regular reflection directions RA, RB of the inspection light and the angle of the imaging optical axis O of the imaging element 23, and the like, are similar to those for the nano projection structure inspection apparatus 1, and thus the explanations are omitted.

Up to this point, a detailed description has been given by way of specific embodiments, which are merely illustrative, and is not construed as limiting the scope of the appended claims. The technology according to the appended claims includes various modifications and changes of the embodiments described up to this point.

What is claimed is:

1. A nano projection structure inspection apparatus, comprising:
   an inspection light irradiation part configured to irradiate inspection light to an inspected surface being a metal surface, wherein a material of the metal surface is aluminum; and
   a chromameter in which an imaging optical axis of an imaging element is arranged to be tilted to a regular reflection direction of the inspection light caused by the inspected surface, wherein
   the chromameter is configured to cause the imaging element to receive diffusion reflection light among reflection light of the inspection light from the inspected surface, the reflection light including regular reflection light and the diffusion reflection light, so as to inspect a nanoscale projection structure on the inspected surface,
   a wavelength region of the inspection light irradiated by the inspection light irradiation part includes a wavelength region of 200 nm to 380 nm, and
   the chromameter is configured to output at least a light reception result of the wavelength region of 200 nm to 380 nm.

2. The nano projection structure inspection apparatus according to claim 1,
   wherein a tilt angle of the imaging optical axis of the imaging element to the regular reflection direction of the inspection light caused by the inspected surface is equal to or more than 50 degrees.

3. A nano projection structure inspection method, comprising:
   an inspection light irradiation step of irradiating, by an inspection light irradiation part, inspection light to an inspected surface being a metal surface, wherein a material of the metal surface is aluminum; and
   an inspection step of causing a chromameter, in which an imaging optical axis of an imaging element is arranged to be tilted to a regular reflection direction of the inspection light caused by the inspected surface, to take an image of diffusion reflection light among reflection light of the inspection light from the inspected surface, the reflection light including regular reflection light and the diffusion reflection light, so as to inspect a nanoscale projection structure on the inspected surface, wherein
   a wavelength region of the inspection light irradiated in the inspection light irradiation step includes a wavelength region of 200 nm to 380 nm, and
   in the inspection step, the nanoscale projection structure is inspected at least on a basis of a light reception result of the wavelength region of 200 nm to 380 nm.

4. The nano projection structure inspection method according to claim 3, wherein a tilt angle of the imaging optical axis of the imaging element to the regular reflection direction of the inspection light caused by the inspected surface is equal to or more than 50 degrees.

* * * * *